(12) United States Patent
Webster

(10) Patent No.: US 8,292,259 B2
(45) Date of Patent: Oct. 23, 2012

(54) MAGNETIC VALVE

(75) Inventor: John R. Webster, Derby (GB)

(73) Assignee: Rolls-Royce PLC, London (GB)

( * ) Notice: Subject to any disclaimer, the term of this patent is extended or adjusted under 35 U.S.C. 154(b) by 512 days.

(21) Appl. No.: 12/451,214

(22) PCT Filed: May 15, 2008

(86) PCT No.: PCT/GB2008/001695
§ 371 (c)(1),
(2), (4) Date: Oct. 30, 2009

(87) PCT Pub. No.: WO2008/152348
PCT Pub. Date: Dec. 18, 2008

(65) Prior Publication Data
US 2010/0096571 A1    Apr. 22, 2010

(30) Foreign Application Priority Data

Jun. 14, 2007  (GB) ................... 0711477.0

(51) Int. Cl.
*F16K 31/08* (2006.01)
(52) U.S. Cl. ............ 251/65; 236/88; 236/93 R; 137/468
(58) Field of Classification Search ............... 251/65; 137/468, 485, 487.5, 808–812; 236/88, 93 R
See application file for complete search history.

(56) References Cited

U.S. PATENT DOCUMENTS

| | | |
|---|---|---|
| 4,005,726 A | 2/1977 | Fowler |
| 4,303,196 A | 12/1981 | Raines et al. |
| 4,361,275 A * | 11/1982 | Mori ................................ 236/88 |
| 5,752,489 A * | 5/1998 | Henderson et al. ............ 123/494 |
| 7,950,590 B2 * | 5/2011 | Ocalan et al. ................... 236/88 |
| 2003/0146402 A1* | 8/2003 | Hirota et al. ............. 251/129.08 |
| 2006/0042260 A1* | 3/2006 | Webster et al. ................ 60/772 |
| 2012/0061596 A1* | 3/2012 | Hensel et al. .................... 251/65 |

FOREIGN PATENT DOCUMENTS

| | | |
|---|---|---|
| EP | 1 316 750 A1 | 6/2003 |
| EP | 1 632 649 A2 | 3/2006 |
| RU | 1802716 * | 3/1993 |

OTHER PUBLICATIONS

Search Report issued for International Application No. PCT/GB2008/001695 on Sep. 8, 2008.
Office Action issued for British Application No. 0711477.0 on Jul. 25, 2007.

* cited by examiner

*Primary Examiner* — John K Fristoe, Jr.
*Assistant Examiner* — Marina Tietjen
(74) *Attorney, Agent, or Firm* — Oliff & Berridge, PLC

(57) ABSTRACT

A magnetic valve arrangement for controlling flow of fluid, the magnetic valve arrangement having at least one ferromagnetic element forming a portion of a magnetic circuit, a valve member and a valve seat; the valve member has a passage therethrough for the flow of fluid and is moveable between a first position, in which the valve member abuts the valve seat to restrict a fluid flow, and a second position, in which the valve member is spaced from the valve seat to allow a fluid flow into and through the passage in the valve member, wherein the position of the valve member is dependent on the temperature of the ferromagnetic element.

15 Claims, 6 Drawing Sheets

MAGNETIC VALVE

CROSS-REFERENCE TO RELATED APPLICATIONS

This application is a National Stage Entry of PCT/GB2008/001695 filed on May 15, 2008, which claims priority to British Appln No. 0711477.0 filed on Jun. 14, 2007, the entire content of which is hereby incorporated by reference.

BACKGROUND

The disclosed embodiments relate to a magnetic valve arrangement for controlling flow of fluid. They find particular application in controlling flow of fluid to a component of a gas turbine engine.

Components in a gas turbine engine are subject to elevated temperatures, often above the melting point of the material or materials from which they are formed. Hence there is a need for cooling of these components, which is conventionally provided by film or impingement cooling of the hot components using relatively cool air ducted from one or more compressor stages. The extraction of air from the compressor stages reduces the amount of air available as working fluid to be supplied to the combustor and turbines of the gas turbine engine. Typically 5 to 10% of the compressed air at an intermediate pressure compressor stage may be extracted to provide cooling to turbine rotor blades and turbine stator guide vanes of one or more turbine stages.

Such cooling systems must be rated for the highest temperature condition in the engine cycle, usually at take-off and maximum climb. However, at other times in the engine cycle, particularly at cruise, less cooling is required. Therefore, it is desirable to modulate the amount of air extracted during these periods to the minimum required to provide adequate cooling. Thus, more air remains as working fluid in the gas turbine engine and hence more output power is achieved.

One known method of modulating the flow of cooling fluid, depending on the engine cycle condition, is detailed in EP 1,632,649 and comprises a magnetic valve located in the cooling air supply conduit. The magnetic valve has at least one member that comprises a ferromagnetic material. The valve has a first configuration in which the valve at least partially restricts the supply conduit and a second configuration in which the supply conduit is substantially unrestricted. The configuration of the valve is dependent on the temperature of the ferromagnetic material.

In one embodiment of this related art, shown in FIG. 1, the ferromagnetic material 14 is a valve member located within an enlarged portion of a supply conduit 12 and in thermal contact, therefore, with the flow of a cooling fluid shown by arrow 16. A permanent magnet 18, or an electromagnet, surrounds the enlarged portion of the supply conduit 12 so that, when the ferromagnetic material 14 is below its Curie temperature, the ferromagnetic material valve member 14 at least partially restricts the flow of cooling fluid 16. When the temperature of the fluid, and therefore of the ferromagnetic material valve member 14, increases towards the Curie temperature of the valve member 14, the valve member 14 loses its magnetism and is pushed along the conduit 12 by fluid pressure or another mechanism. Stops 20 may be provided to support the valve member 14 such that the fluid flow 16 is substantially unrestricted through the conduit 12.

One problem with this method of modulating the cooling fluid flow is that the ferromagnetic valve member presents a large surface area to the fluid flow. This means that the magnets that hold the ferromagnetic valve member against the flow must be large and/or additional means, such as a spring, must be provided to enable the ferromagnetic valve member to resist the fluid flow and at least partially restrict the supply conduit when the ferromagnetic valve member is below its Curie temperature.

Another problem with this method of modulating the cooling fluid flow is that the ferromagnets required to provide sufficient force to resist the fluid pressure are large. This means that they have a large thermal inertia and, therefore, the response time of the valve is relatively long; typically of the order of a few seconds. In some applications, particularly within gas turbine engines, this is unacceptably long.

A further problem with this method of modulating the cooling fluid flow is that the valve components are bulky and heavy. In some applications, particularly within the core of a gas turbine engine, there is little space to accommodate additional components and weight is critical.

SUMMARY

The present invention seeks to provide a magnetic valve arrangement that seeks to address the aforementioned problems.

Accordingly the present invention provides a magnetic valve arrangement for controlling flow of fluid, the magnetic valve arrangement having at least one ferromagnetic element forming a portion of a magnetic circuit, a valve member and a valve seat; the valve member has a passage therethrough for the flow of fluid and is moveable between a first position, in which the valve member abuts the valve seat to restrict a fluid flow, and a second position, in which the valve member is spaced from the valve seat to allow a fluid flow into and through the passage in the valve member, wherein the position of the valve member is dependent on the temperature of the ferromagnetic element.

Preferably at least a portion of the valve member comprises a part of the magnetic circuit. More preferably, it comprises the ferromagnetic element. Even more preferably, the valve member comprises a tube.

Preferably a permanent magnet or electromagnet forms a portion of the magnetic circuit. More preferably the permanent magnet or electromagnet is coaxial with the valve member.

Preferably the valve member has its axis of symmetry perpendicular to a direction of fluid flow in the fluid conduit.

Preferably the magnetic valve arrangement further comprises sealing means. More preferably the sealing means is a sliding seal between the tube element and a wall of the fluid conduit. Alternatively the sealing means is at least one poppet valve seal.

Preferably the magnetic valve arrangement further comprises at least one locating feature. Preferably the locating feature is a leaf spring or Belleville washer.

Preferably the ferromagnetic element is thermally coupled to the flow of fluid in the fluid conduit. Alternatively the ferromagnetic element is thermally coupled to a second fluid. The thermal coupling may be by means of at least one duct to deliver fluid to the ferromagnetic element. Alternatively the ferromagnetic element is thermally coupled to a component.

One aspect of the present invention provides a gas turbine engine including a magnetic valve. The ferromagnetic element may be thermally coupled to a component of the gas turbine engine. The component of the gas turbine engine may be thermally coupled to the flow of fluid.

Preferably the flow of fluid from the fluid conduit is directed to a component of a gas turbine engine. Alternatively or additionally, the flow of fluid from the fluid conduit is directed to re-enter the fluid conduit.

Preferably the fluid conduit is substantially restricted when the ferromagnetic element is above or near its Curie temperature. Alternatively the fluid conduit is substantially restricted when the ferromagnetic element is below its Curie temperature.

BRIEF DESCRIPTION OF THE DRAWINGS

The present invention will be more fully described by way of example with reference to the accompanying drawings, in which.

DETAILED DESCRIPTION OF THE EMBODIMENTS

Figure 1:
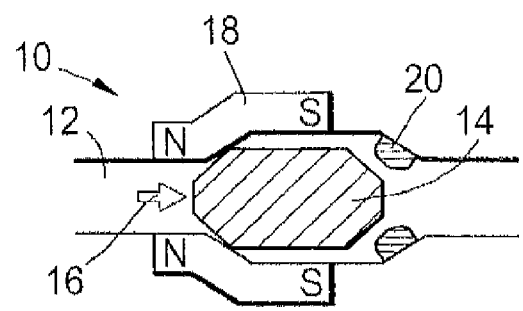
FIG. 1 is a schematic side view of a magnetic valve according to the related art.
Figure 2:
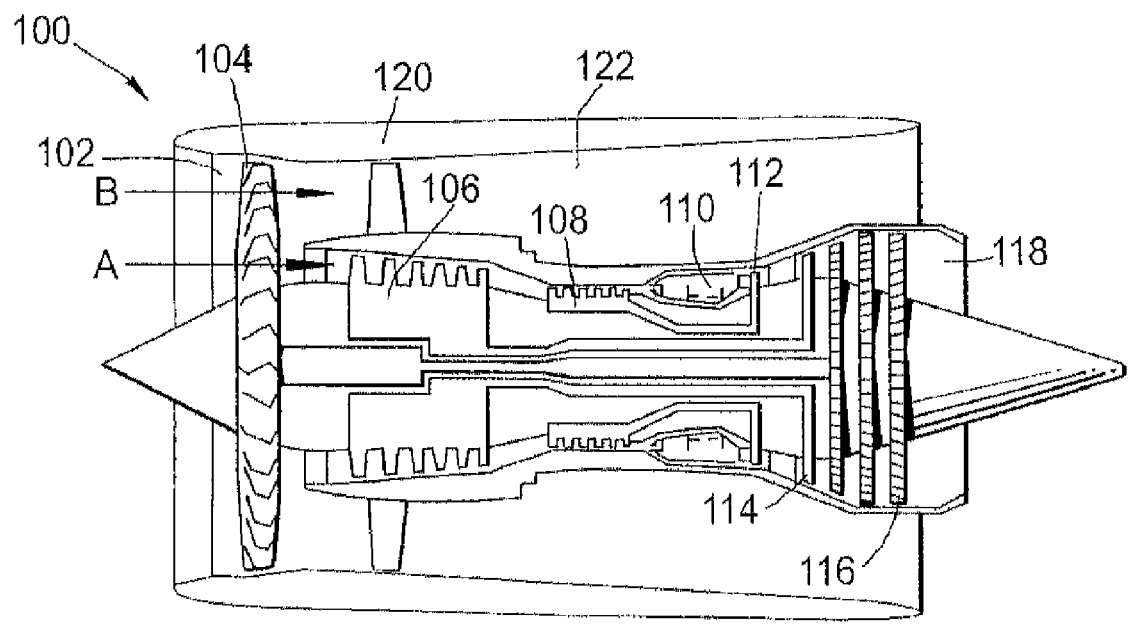
FIG. 2 is a schematic side view of a gas turbine engine incorporating a magnetic valve according to the present invention.

A gas turbine engine 100 is shown in FIG. 2 and comprises an air intake 102 and a propulsive fan 104 that generates two airflows A and B. The gas turbine engine 100 comprises, in axial flow A, an intermediate pressure compressor 106, a high pressure compressor 108, a combustor 110, a high pressure turbine 112, an intermediate pressure turbine 114, a low pressure turbine 116 and an exhaust nozzle 118. A nacelle 120 surrounds the gas turbine engine 100 and defines, in axial flow B, a bypass duct 122. Air may be extracted from a compressor stage 106, 108, or the bypass duct 122 and be selectively passed to a turbine stage 112, 114, 116 for cooling the turbine stage 112, 114, 116 via a magnetic valve arrangement according to the present invention.

Figure 3:
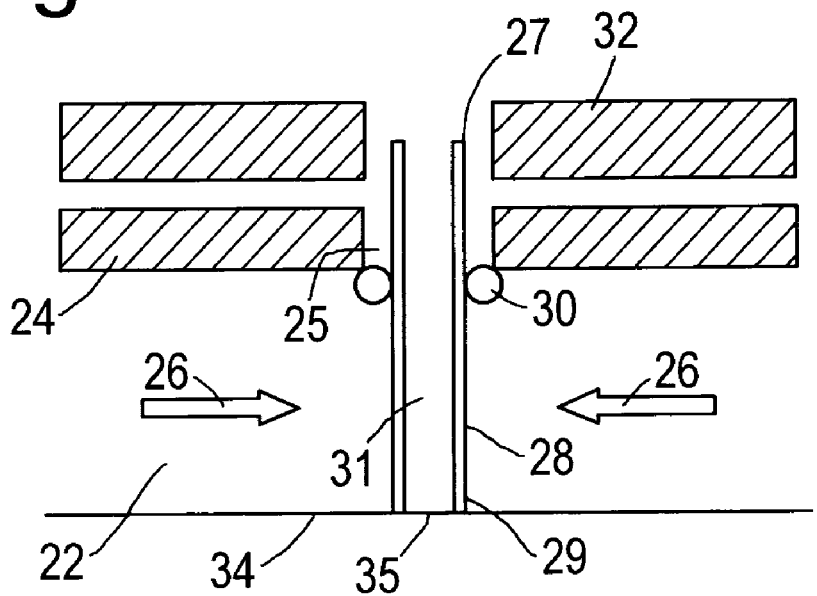
FIG. 3 is a schematic side view of an exemplary embodiment of a magnetic valve arrangement according to the present invention in a first configuration.

An exemplary embodiment of the present invention is shown in FIG. 3. A fluid conduit 22 is defined on a first side, in this example an upper side, by a first wall 24 and on a second side, in this example a lower side, by a second wall 34. The fluid conduit 22 is arranged so that fluid flows towards a central portion, as shown by arrows 26. The first wall 24 is provided with an aperture 25 which extends perpendicularly through the first wall 24 in the central portion of the fluid conduit 22. A valve member tube 28 is positioned in and located by the aperture 25 and extends perpendicularly through the first wall 24. The tube 28 comprises a ferromagnetic material. A seal 30 is arranged between the tube 28 and the first wall 24; for example the seal 30 is a lip, labyrinth or o-ring seal. The seal 30 may also act as a locating feature or a separate locating feature may be used. An annular, or ring, permanent magnet 32, or electromagnet, is located above the first wall 24, outside the fluid conduit 22 in this example, and surrounds the ferromagnetic tube 28. Thus the permanent magnet 32 is coaxial with the tube 28. The tube 28 has a first (upper) end 27 outside the fluid conduit 22 and a second (lower) end 29 within the fluid conduit 22.

When the ferromagnetic tube 28 is near or above its Curie temperature it loses its magnetic properties and the tube 28 moves, by gravity or another mechanism such as a spring (not shown), such that the second end 29 of tube 28 seals against a valve seat portion 35 of the second wall 34 of the fluid conduit 22. Therefore, no fluid can flow into the tube 28 from the fluid conduit 22 and, hence, the fluid conduit 22 is substantially restricted and the magnetic valve is closed.

Figure 4:
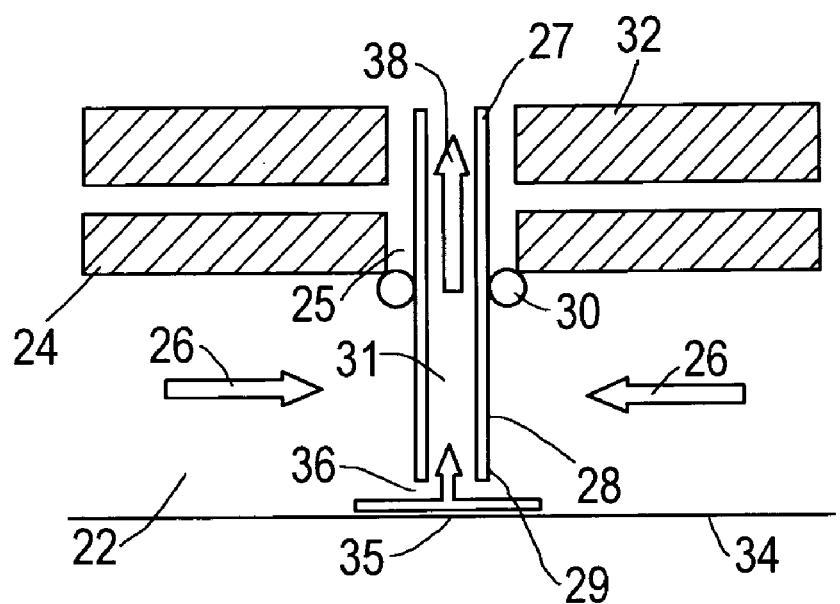
FIG. 4 is a schematic side view of an exemplary embodiment of a magnetic valve arrangement according to the present invention in a second configuration.

When the ferromagnetic tube 28 is cooled below its Curie temperature it becomes magnetic and therefore the first end 27 of the tube 28 is attracted to the permanent magnet 32. This is the configuration shown in FIG. 4. Hence, there is a clearance 36 between the second wall 34 of the fluid conduit 22 and the second end 29 of the tube 28. The flow of fluid 26 in the fluid conduit 22 is thus able to pass through the clearance 36 and through the centre bore 31 of tube 28. The fluid can then be ducted or otherwise transported to a component to be cooled or a component or system requiring fluid.

There are several advantages to providing a tube 28 as the valve member of the magnetic valve arrangement, Firstly, the tube 28 has a small surface area in the direction of fluid flow 38 when the valve is open. This means that less force is generated in the vertical direction and so a smaller permanent magnet 32 is required to effect the movement of the tube 28 or the tube 28 can move a greater distance vertically and therefore offer more clearance 36 for the fluid flow 26, 38. Secondly, the tube 28 is a strong and rigid shape and allows the use of a thin walled tube. Thus, there is little thermal inertia associated with a thin walled tube 28 and the valve can react more quickly than related art arrangements. Thirdly, the whole of the tube 28 need not be ferromagnetic.

Figure 5:
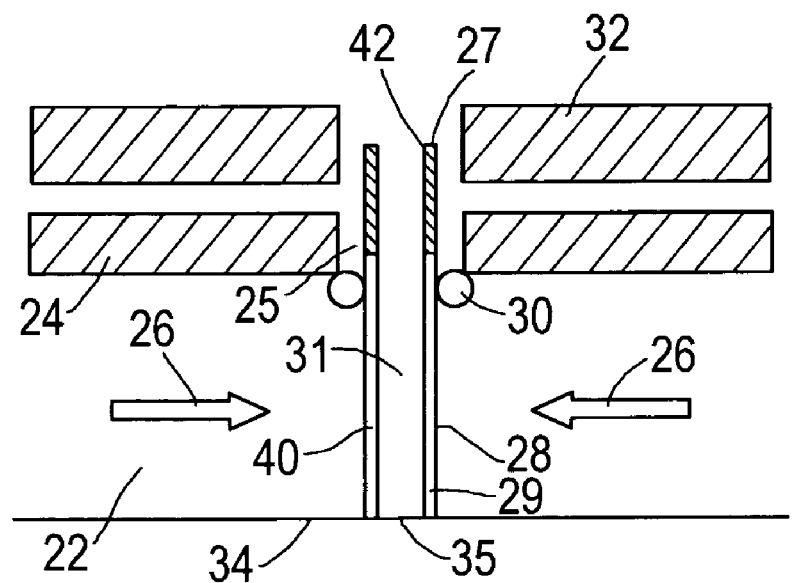
FIG. 5 is a schematic side view of a second embodiment of a magnetic valve arrangement according to the present invention in a first configuration.

FIG. 5 shows an embodiment of the present invention in which the tube 28 comprises a non-magnetic second portion 40 at the second end 29, nearest the second wall 34 of the fluid conduit 22 and a ferromagnetic first portion 42 at the first end 27, nearest the coaxial, annular permanent magnet 32. Alternatively, the tube 28 may comprise a non-magnetic material at both ends 27, 29 and a ferromagnetic portion in its central region, appropriately near the permanent magnet 32.

Figure 6:
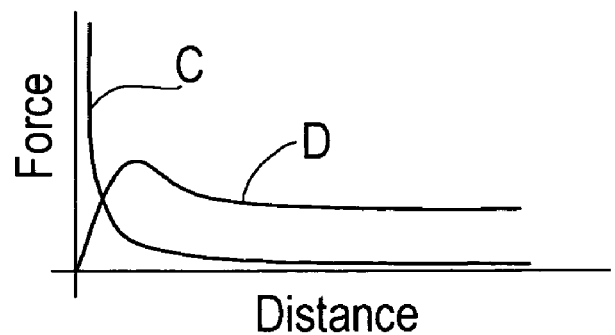
FIG. 6 is a characteristic plot of distance and force for a related art magnetic valve and a magnetic valve according to the present invention.

Due to the shape of the permanent magnet 32, the ferromagnetic tube 28 experiences a more emphasised change in flux as it moves between the first and second configurations (e.g. FIG. 3 and FIG. 4) of the magnetic valve arrangement. This provides a variable reluctance to achieve the moving force and therefore a greater operating range for the tube 28. A schematic plot of this is shown in FIG. 6 in which the curve C is a typical characteristic for a related art magnetic valve and the curve D is a typical characteristic for the magnetic valve arrangement of the present invention. It is clear that a magnetic valve with characteristic curve D experiences no force when the tube is precisely aligned with the surrounding magnet. However, there is a useable amount of force generated over a much greater distance than for the related art magnetic valve with a characteristic curve C.

Although the seal 30 has been described as a locating feature between the first wall 24 and the tube 28 it may equally be a leaf spring, a Belleville washer or another locating feature arrangement. There may be locating features at more than one location. These locating features may be the same or different types.

Additional or alternative sealing arrangements to seal 30 may be used, such as lip, labyrinth, o-ring or poppet valve seals. There may be sealing at more than one location, for example at the lower edge of the first wall 24 and at the upper edge of the permanent magnet 32. These multiple seals 30 may be the same or different types of seal. There may also be additional sealing 44 between the second end 29 of the tube 28 and the second wall 34 of the fluid conduit 22.

Figure 7:
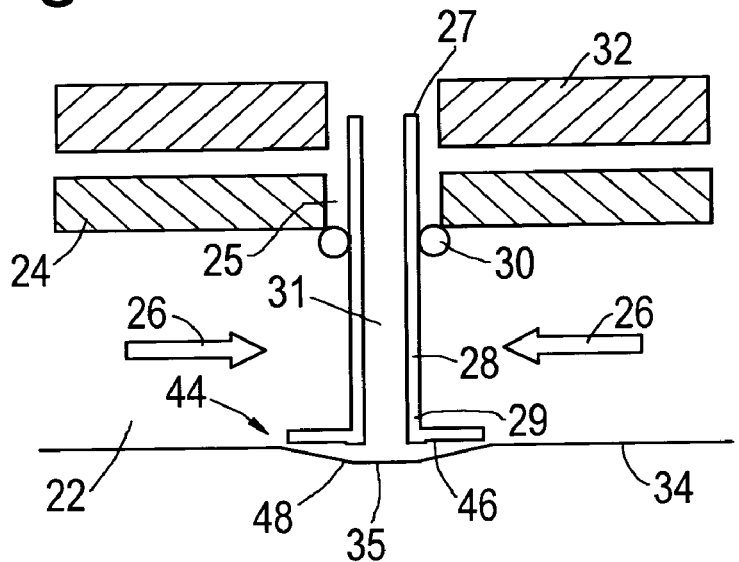
FIG. 7 is a schematic side view of a third embodiment of a magnetic valve arrangement according to the present invention in a first configuration.

FIG. 7 shows an embodiment of the present invention in which the second end 29 of the tube 28 is provided with a skirt 46 extending outwardly. The valve seat 35 of the second wall 34 of the fluid conduit 22 has an arcuate recessed portion 48 into which the skirt 46 seats to improve the sealing of the tube 28 against the second wall 34 of the fluid conduit 22.

Figure 8:
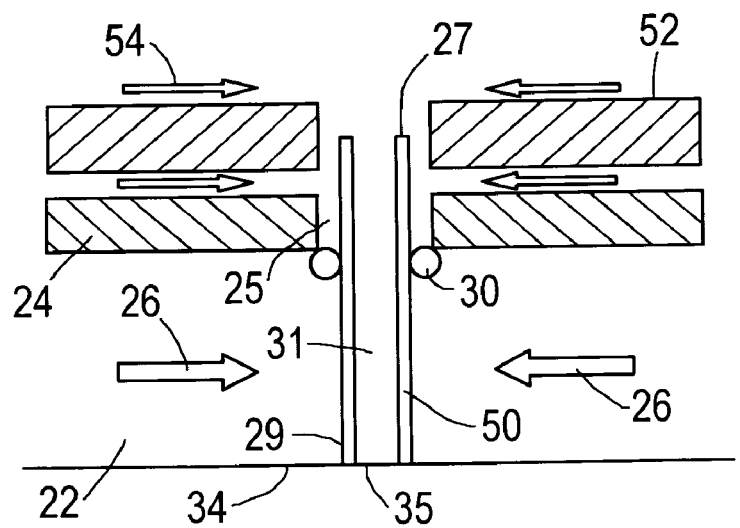
FIG. 8 is a schematic side view of a fourth embodiment of a magnetic valve arrangement according to the present invention in a first configuration.

The embodiments described hereinbefore all have at least a part of the tube 28 comprising ferromagnetic material and a permanent magnet 32, or an electromagnet, surrounding a part of the tube 28. The advantages of the present invention may be equally achieved by reversing the positions of the ferromagnetic material and magnetic material. FIG. 8 shows an embodiment of the present invention in which at least a part of the tube 50 comprises a permanent magnet and there is an annular ferromagnet 52 surrounding it and coaxial with it.

The arrangement of FIG. 8 enables the ferromagnet 52 to be heated or cooled by a variety of sources. In the previously described embodiments the ferromagnetic tube 28 is heated or cooled by the fluid flow 26. In the arrangement of FIG. 8 the ferromagnet 52 may be heated or cooled by this fluid flow 26, or by a ducted portion thereof. However, it may also be heated or cooled by another fluid flow 54 from a different source, which may be relatively distant from the magnetic valve arrangement. Alternatively, it may be heated or cooled by being thermally coupled to the component that requires the fluid flow, or to another component. For example, thermally conductive tracks (not shown), possibly comprising ferromagnetic material for at least part of their length, may link a component and the ferromagnet 52 to cause the magnetic valve arrangement to operate dependent on the thermal condition of a relatively remote component.

These alternative methods of changing the temperature of the ferromagnetic element can equally be used in any of the described embodiments of the present invention.

Figure 9:
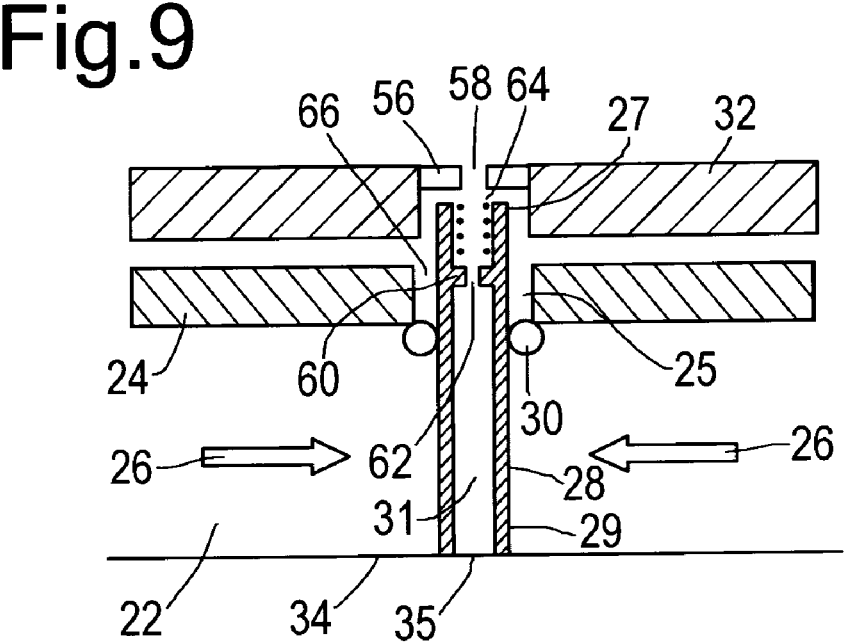
FIG. 9 is a schematic side view of a fifth embodiment of a magnetic valve arrangement according to the present invention in a first configuration.

FIG. 9 shows an embodiment of the present invention in which additional components are provided. An end stop 56 is provided extending inwardly from the permanent magnet 32 and the end stop 56 is provided with a central aperture 58 to permit the fluid flow to pass. Preferably, the end stop 56 is not magnetic, so as not to upset the flux patterns. Alternatively, the end stop 56 may be magnetic and appropriate compensation be made for the flux variations. A cylindrical mounting block 60 is provided within the tube 28, a short distance below the first end 27 of the tube 28. The mounting block 60 protrudes from the internal surface of the tube 28 but has an aperture 62 to permit the fluid to pass. A spring 64 is provided between the mounting block 60 and the end stop 56. The spring 64 provides a biasing force that can be arranged either to close or to open the valve arrangement. Alternatively, the mounting block 60 may project from the external surface of the tube 28 and the spring 64 may be located adjacent the external surface of the tube 28 in the gap 66 sealed by seal 30.

Figure 10:
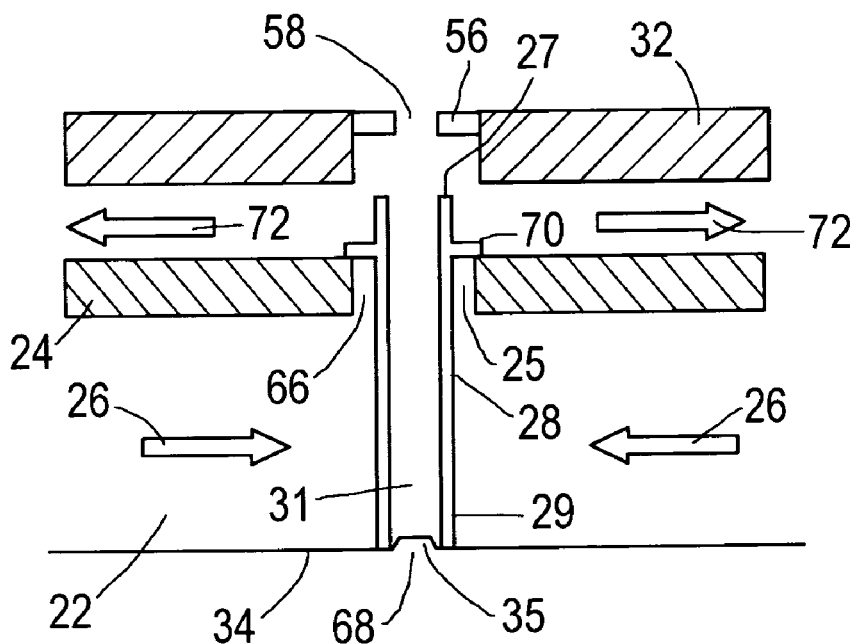
FIG. 10 is a schematic side view of a sixth embodiment of a magnetic valve arrangement according to the present invention in a first configuration.

A sixth embodiment of the magnetic valve arrangement of the present invention is shown in FIG. 10. The permanent magnet 32 again includes an end stop 56 extending inwardly and having an aperture 58 centrally to permit fluid flow when the valve is in an open configuration. A poppet valve 70 is provided that extends outwardly from the walls of the tube 28 and is arranged to sit between the first wall 24 and the permanent magnet 32. The poppet valve 70 seals against the first wall 24 when the valve is in the closed configuration so that the incoming fluid flow 26 is isolated from the outward fluid flow 72. Thus, secondary sealing, such as by seal 30 from FIG. 3, is unnecessary. The poppet valve 70 may additionally or alternatively be further arranged to seal against the permanent magnet 32 when the magnetic valve arrangement is in the open configuration. This, therefore, directs fluid flow through the gap 66 between the tube 28 and the first wall 24 and distributes the fluid outwardly in the directions shown by arrows 72. This flow 72 may subsequently be directed towards one or more components of the gas turbine engine that require the fluid for cooling or another purpose. This component or components may be the same as that supplied by the fluid exiting the first end 27 of the tube 28 or may be a different component or components. Alternatively, the flow 72 may be directed back into the fluid conduit 22 upstream of the tube 28. Optionally, the arrangement shown in FIG. 10 may also include a spring (not shown), similar to spring 64 in FIG. 9, extending between the poppet valve 70 and the end stop 56.

The embodiment shown in FIG. 10 also includes an alternative sealing arrangement at the second end 29 of tube 28. The valve seat 35 of the second wall 34 of the fluid conduit 22 is a raised portion 68 that protrudes towards the tube 28 and is dimensioned and shaped to seat closely within the second end 29 of the tube 28 when the valve is in the closed configuration to provide sealing. When the valve is in the open configuration the raised portion 68 does not significantly impede fluid flow from the fluid conduit 22 into, and through, the central bore 31 of the tube 28.

It is preferable, in the embodiment shown in FIG. 10, to design the components of the magnetic valve arrangement to provide the same effective diameter for fluid ingress and egress, namely through the second end 29 of the tube 28 and the combination of through the first end 27 of the tube 28 and adjacent the poppet valve 70. If these two areas have the same effective diameter there is no net pressure on the tube 28. However, it may be preferable to design different effective diameters so that there is a pressure difference between the two ends of the tube 28 as this will assist the magnetic valve arrangement to switch between the closed and open configurations as the ferromagnetic element (being the tube 28 in the illustrated embodiment) begins to lose its magnetism. This is earlier than without the assistance of the pressure difference and therefore results in a more rapid response time, in contrast to the related art. This arrangement may additionally or alternatively mean that less magnetic force is required to actuate the valve and hence smaller magnetic components may be used.

Figure 11:
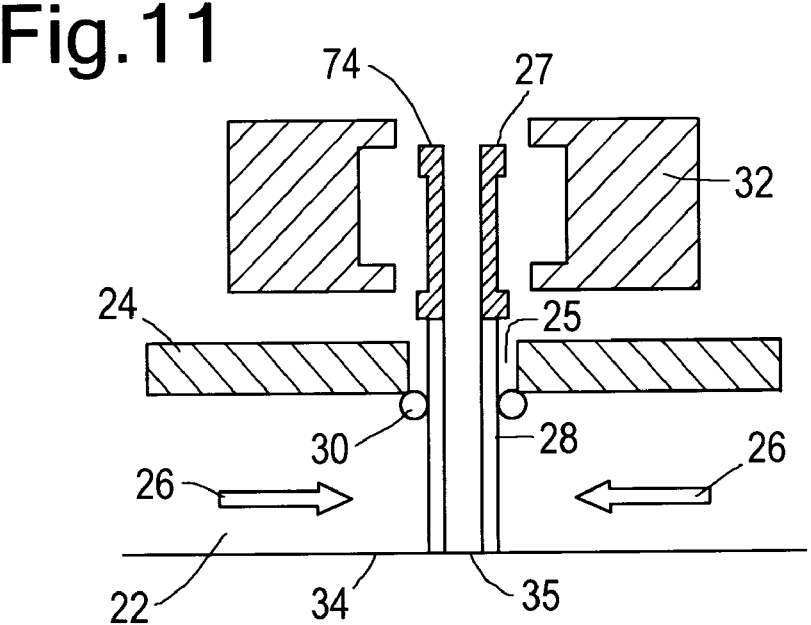
FIG. 11 is a schematic side view of a seventh embodiment of a magnetic valve arrangement according to the present invention in a first configuration.

A seventh embodiment of the present invention is shown in FIG. 11. In this arrangement the tube 28 is non-magnetic and has, at its first (upper) end 27, a C-shaped annular ferromagnetic portion 74. The outwardly facing protrusions of this C-shaped ferromagnetic portion 74 correspond to similar, inwardly facing protrusions at the upper and lower extents of the annular, coaxial permanent magnet 32. The purpose of the protrusions is to preferentially concentrate, or guide, the flux and therefore increase the available force. This again provides the advantages of offering a greater range of movement of the tube 28 and/or reducing the size of permanent magnet 32 that is required to effect that movement.

It will be understood by the skilled reader that the fluid may be any suitable fluid. The magnetic valve arrangement of the present invention finds particular application in selectively providing cooling to one or more components of a gas turbine engine, for example during take off but not cruise of an aircraft powered by the engine, and in this case the fluid would typically be air extracted from a compressor stage or the bypass flow. Alternatively, it may be ambient air or a working fluid, for example fuel or oil. The invention has equal utility in selectively providing heating, for example for anti-icing or assisting during cold starting of the engine, and the fluid may therefore be exhaust gases, air extracted from a turbine stage or air passed through a heat exchanger. Alternatively, it may be heated or re-circulated fuel or oil, or another fluid. In other applications other fluids may be more appropriate, for example cryogenic fluids, provided that the fluid and materials used to construct the magnetic valve arrangement are compatible.

The magnetic valve of the present invention also has utility as a safety valve, whether to cut off a fluid flow above a given temperature or to provide a fluid flow, particularly a cooling flow, above a given temperature. Alternatively the magnetic valve acting as a safety valve may control a heating flow. The magnetic valve may be controlled by the same flow that is provided to the component, heating or cooling, or by a different flow or by thermal coupling to the same component or a different component.

Figure 12:
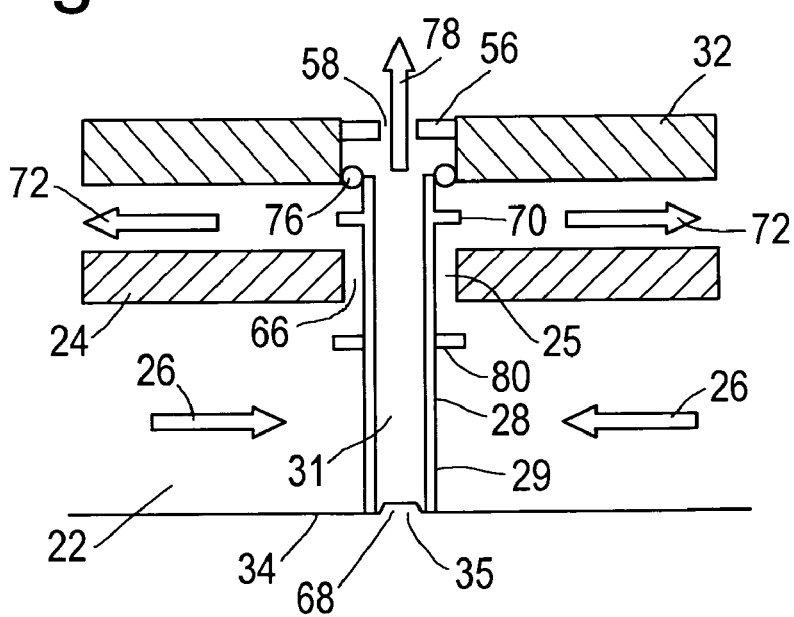
FIG. 12 is a schematic side view of an eighth embodiment of a magnetic valve arrangement according to the present invention in a first configuration.

The magnetic valve of the, present invention can be arranged as a two-way valve, as shown in FIG. 12, and used in one of two ways. The arrangement in FIG. 12 is substantially the same as in FIG. 10 except that poppet valve 70 is located intermediate the first wall 24 and the permanent magnet 32 such that the poppet valve 70 abuts the permanent magnet 32 when the valve is in the open configuration. Additional sealing 76 is provided between the first end 27 of the tube 28 and the permanent magnet 32. In the first way of using the two-way valve, a single fluid flow 26 is provided to one of two different components, or component groups, depending on the temperature of the ferromagnetic tube 28. Hence, when the valve is in the closed configuration incoming fluid flow 26 is directed through gap 66 and outward as fluid flow 72. When the valve moves to the open configuration incoming fluid flow 26 is able to flow through the central bore 31 of the tube 28 and thence exit as fluid flow 78 through aperture 58. Optionally secondary sealing 80, in the form of a poppet valve, may be provided to ensure the fluid flow only exits through aperture 58 as fluid flow 78. Omitting this secondary sealing 80 enables fluid egress as fluid flow 72 in the open and closed configurations. In the second way of using the two-way valve the fluid flows 26, 72, 78 are reversed. Thus one of two different fluid flows 72, 78 (reversed) are provided to a single component via a single fluid flow 26 (reversed) depending on the temperature of the ferromagnetic tube 28.

Although each embodiment of the present invention has been described with specific features, it will be understood that several of these features are interchangeable between the different embodiments. For example, the seal 30 shown in FIG. 11 could be replaced or supplemented by the raised portion 68 of FIG. 10, a poppet valve in one or more of the locations discussed herein, the skirt 46 shown in FIG. 7, a leaf spring, a Belleville washer or any other known sealing arrangement. Similarly, although most of the embodiments are shown with the tube 28 at least partially comprising the ferromagnetic element and a permanent magnet 32, or electromagnet, surrounding it, the skilled reader will understand that these may be reversed if appropriate to the application contemplated.

Preferably the ferromagnetic tube is circular in cross-section and the permanent magnet is annular. Alternatively the tube may have any other suitable cross-sections e.g. square, rectangular, hexagonal.

Although the present invention has been contemplated with respect to applications in the gas turbine engine industry it may be used in other industries including, but not limited to, automotive, airframe, air-conditioning and power generation. Alternatively it may find application in other industries, for example in medical applications such as dialysis.

What is claimed is:

1. A magnetic valve arrangement for controlling flow of fluid, the magnetic valve arrangement comprising:
   at least one ferromagnetic element forming a portion of a magnetic circuit;
   a valve member; and
   a valve seat, wherein
   the valve member is disposed substantially fluid conduit,
   the valve member has a passage therethrough configured to allow passage of a flow of fluid,
   the valve member is moveable between a first position, in which the valve member abuts the valve seat to restrict the flow of fluid, and a second position, in which the valve member is spaced from the valve seat to allow the flow of fluid into and through the passage in the valve member,
   whether the valve member is in the first position or the second position depends on a temperature of the at least one ferromagnetic element, and
   the valve member comprises a tube.

2. The magnetic valve arrangement as claimed in claim 1, wherein at least a portion of the valve member comprises a part of the magnetic circuit.

3. The magnetic valve arrangement as claimed in claim 1, wherein at least a portion of the valve member comprises the at least one ferromagnetic element.

4. The magnetic valve arrangement as claimed in claim 1, wherein a magnet selected from the group consisting of a permanent magnet and an electromagnet forms a portion of the magnetic circuit.

5. The magnetic valve arrangement as claimed in claim 4, wherein the magnet is coaxial with the valve member.

6. The magnetic valve arrangement as claimed in claim 1, wherein the valve member has an axis of symmetry perpendicular to a direction of fluid flow in the fluid conduit.

7. The magnetic valve arrangement as claimed in claim 1, further comprising:
   a sealing means.

8. The magnetic valve arrangement as claimed in claim 7, wherein the sealing means is selected from the group consisting of a sliding seal between the tube and a wall of the fluid conduit, and at least one poppet valve seal.

9. The magnetic valve arrangement as claimed in claim 1, further comprising:
   at least one locating feature selected from the group consisting of a leaf spring and a Belleville washer.

10. The magnetic valve arrangement as claimed in claim 1, wherein the at least one ferromagnetic element is thermally coupled to one of the flow of fluid in the fluid conduit, a second flow of fluid, and a component of a gas turbine engine.

11. The magnetic valve arrangement as claimed in claim 10, wherein the at least one ferromagnetic element is thermally coupled by means of at least one duct to deliver the fluid to the at least one ferromagnetic element.

12. A gas turbine engine including the magnetic valve arrangement as claimed in claim 1, wherein the at least one ferromagnetic element is thermally coupled to a component of the gas turbine engine.

13. The magnetic valve arrangement as claimed in claim 1, wherein the flow of fluid in the fluid conduit is directed to one of the group consisting of a component of a gas turbine engine and a re-entrance of the fluid conduit.

14. The magnetic valve arrangement as claimed in claim 1, wherein the fluid conduit is substantially restricted when the at least one ferromagnetic element is above or near Curie temperature of the at least one ferromagnetic element.

15. A gas turbine engine including the magnetic valve arrangement as claimed in claim 1, wherein a component of the gas turbine engine is thermally coupled to the flow of fluid.

* * * * *